EMILE BEDE.
Improvement in Dividing Apparatus for Condensing Carding-Machines.
No. 126,439.  Patented May 7, 1872.
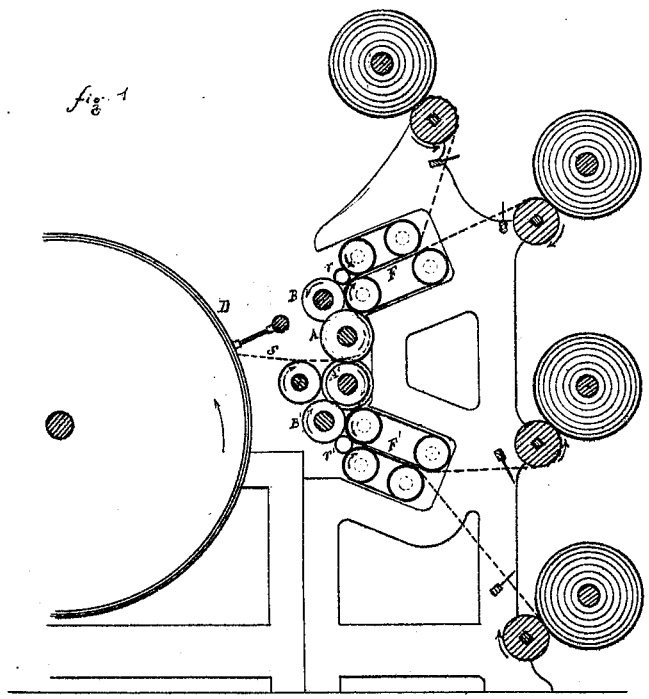
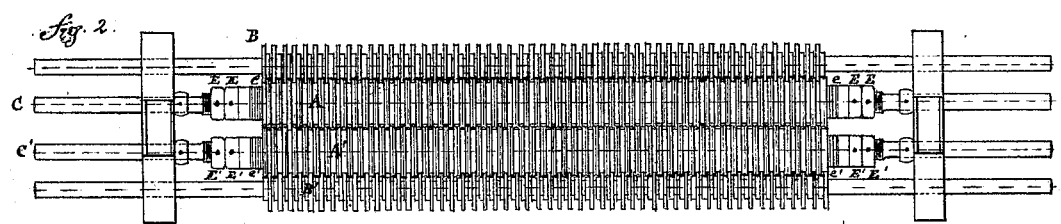
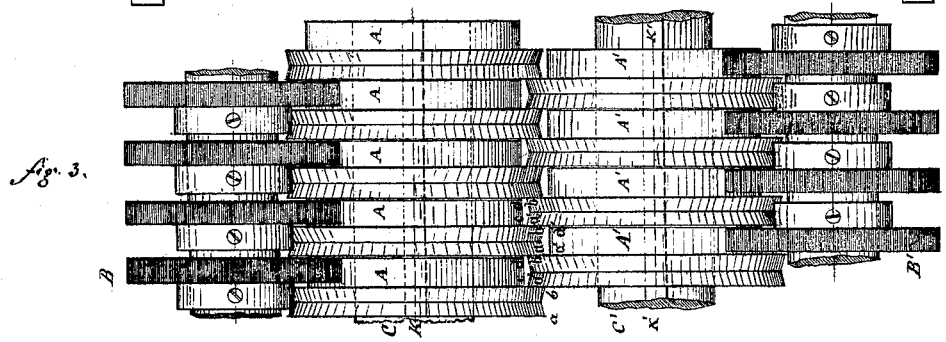
Witnesses
Inventor 126,439

UNITED STATES PATENT OFFICE.

EMILE BEDE, OF VERVIERS, BELGIUM.

IMPROVEMENT IN DIVIDING-APPARATUS FOR CONDENSING CARDING-MACHINES.

Specification forming part of Letters Patent No. 126,439, dated May 7, 1872.

*To all whom it may concern:*

Be it known that I, EMILE BEDE, of Verviers, in the Kingdom of Belgium, a partner in the firm of BEDE & CO., constructing engineers, have invented or discovered new and useful Improvements in Means or Apparatus for Operating on Cardings of Wool or other fiber; and I do hereby declare that the following is a full and exact description thereof, reference being had to the accompanying drawing and to the letters of reference marked thereon.

This invention consists in means or apparatus for dividing the sheet of wool or other fiber, as it leaves the carding-engine, into a series of strips or slivers, and conducting the said strips or slivers thus formed to the rubbing apparatus, where they are rubbed into rovings or threads. According to this invention the said sheet of wool or other fiber is divided into strips or slivers by being made to pass between a pair of adjustable grooved and ribbed dividing-cylinders, constructed by preference, as hereinafter described. The ribs of the said cylinders have sharp edges, and the pair of dividing-cylinders is arranged so that the ribs on one cylinder take into the grooves of the other cylinder. Each of the said grooves and ribbed dividing-cylinders is composed of a series of rollers placed side by side upon a revolving shaft; rather more than half the width of each roller is of larger diameter than the remaining portion of the roller, so that when the said rollers are set in position side by side the larger portions of the said cylinders or rollers form the ribs of the dividing-cylinders, and the parts of less diameter of the said rollers form the grooves in the said dividing-cylinders. If desired each of the said rollers might be made of two separate cylindrical pieces of different diameters, one forming a rib and the other a groove, but we prefer to make them both in one piece. The part of each roller forming the projecting circular rib is in section slightly dovetailed—that is to say, tapering from the periphery on both sides—and it is preferred that the cylindrical surface of the said rib should be slightly recessed in the middle, so as to allow of the edges being more readily sharpened. Central holes of equal diameter having been bored in a series of the said rollers, and a uniform key slot having been cut in the said holes, each series of rollers is mounted upon a rotary shaft, upon which is a longitudinal key or feather to prevent the said rollers from turning. The ends of the said shafts are of smaller diameter than the part upon which are the rollers, the said ends being supported in similar bearings. A screw-thread is cut upon each end of the thicker part of the said shafts to receive screw-nuts, by which the rollers on the shafts may be tightened up so as to cause the ribs of one cylinder to press gently against those of the other cylinder when the two shafts are in position. Washers of India rubber or other elastic material are placed between the tightening-nuts and the last roller at each end of the series of rollers in order that the pressure may be more elastic; and, if required, thinner washers of similar material may be interposed between the inside rollers of each series for the same purpose. The above-described pair of dividing-cylinders is placed just in front of the doffer of the carding-engine, and the sheet of wool or other fiber detached from the doffer passes between the said dividing-cylinders, and is divided into as many narrow slivers as there are rollers in both cylinders. The said slivers adhere to the recesses or grooves of the said cylinders, and are carried off by them in different directions, one-half of the said slivers running upward and the other half downward. The said slivers are detached from the grooves of the dividing-cylinders by supplementary ribbed rollers fixed on revolving-spindles, and the ribs of which rollers take into the recesses or grooves of the dividing-cylinders close enough to take off the slivers and conduct them to the rubbers—a revolving feed-roller in contact with each rubbing apparatus—insuring the proper and continuous delivery of the slivers to the said rubbing apparatus.

Having thus described the nature of my said invention, I will, by the aid of the accompanying drawing, proceed to describe means pursued by me in carrying the same into practical effect.

Figure 1 is a sectional view of part of a carding-engine, to which my improvements are applied; Fig. 2 is a longitudinal view of my improved dividing apparatus detached; and Fig. 3 represents a part of the dividing-cylinders drawn to a larger scale.

The same letters of reference indicate like parts in Figs. 1, 2, and 3.

D, Fig. 1, represents the doffer of a carding-engine; A A' are the dividing-cylinders, by which the sheet or web of fiber $s$ from the carding-engine is divided into strips or slivers. The construction of the said dividing-cylinders will be readily understood by reference to Fig. 3. A A A A A A' A' A' A' A' are two series of rollers, mounted, respectively on the shafts C C', and capable of sliding longitudinally upon the said shafts while they are prevented from turning upon them by the longitudinal keys or feathers K K'. The said rollers A A' each form projecting ribs $a\ b\ a'\ b'$ and grooves $c\ d\ c'\ d'$, the ribs $a\ b\ a'\ b'$ being rather wider than the groove-rings $c\ d\ c'\ d'$. The sides of the ribs $a\ b\ a'\ b'$ taper slightly from the periphery to the inside—that is, from $b$ to $c$ and from $a$ to $d$, and in the middle of their cylindrical surfaces $a\ b$ they are slightly recessed, as shown in Fig. 1. E E E' E' are screw-nuts; and $e\ e\ e'\ e'$ are washers of India rubber or other elastic material. The said screw-nuts serve to tighten together all the rollers A A', so that the ribs A and A' may press one against the other, and together form rotatory cutters. B B' are supplementary ribbed rollers, the ribs of which take into the grooves or recesses of the rollers A A', detaching the slivers therefrom, and conducting them to the rubbing apparatus F F', with which they are further made to engage by the feed-rollers $r\ r'$, in contact with the said rubbing apparatus. The sheet of fiber $s$ passes from the doffer D to between the dividing-cylinders A A', which rotate in the direction of the arrows, Fig. 1, and divide the said sheet into as many narrow slivers as there are ribs on the said cylinders A A'. The said slivers adhere to the grooves of the said cylinders, and are carried round in the said grooves, one-half in the direction of A and the other half in the direction of A', when, coming in contact with the ribs of the supplementary rollers B B', they are detached from the rollers A A', and are conducted to between the rollers $r\ r'$ and the rubbing apparatus F F'. They then become engaged in the said rubbing apparatus and are rubbed into rovings or threads. When the separate slivers have become engaged between the rubbers F F' and the small feed-rollers $r\ r'$ they pass directly from the dividing apparatus A A' to the rubbers. The rollers B B' might then be removed or put out of gear; but it is preferred to leave them in motion, as they do not cause any inconvenience, and one of the narrow slivers might break on leaving the dividing apparatus, and in that case it would be caught by the supplementary roller and passed on to the rubbers.

Having now described the nature of my invention, and means pursued by me in carrying the same into practical effect, I wish it to be understood that I do not confine myself to the precise details hereinbefore described and illustrated in the accompanying drawing, as they may be modified in divers ways without departing from the nature of my invention.

But I claim as my invention—

1. The dividing apparatus, constructed and arranged substantially as hereinbefore described and illustrated in the accompanying drawing, for cutting or dividing the sheet of wool or other fiber produced by a carding-engine, into small slivers, and which consists of a pair of ribbed and grooved rollers or cylinders, composed each of a series of rollers mounted on a revolving shaft, and capable of sliding freely on the said shafts, which are parallel one to the other, and placed near enough together for the projecting circular ribs on the rollers of one shaft to engage and be pressed between the ribs of the rollers on the other shaft, so that the sheet of fiber cannot pass on the sides of the said rollers, but is divided into slivers of the breadth of the said ribs or circular projections.

2. The devices for conducting the small slivers from the dividing-cylinders to the rubbers, substantially as hereinbefore described and illustrated in the accompanying drawing—that is to say, by means of supplementary ribbed rollers, the ribs of which rollers take into the grooves of the dividing-rollers, and detach the slivers therefrom and conduct them to the rubbing apparatus.

E. BEDE.

Witnesses:
W. H. KIRKPATRICK,
R. S. KIRKPATRICK.